No. 671,934. Patented Apr. 9, 1901.
C. C. & E. A. RIOTTE.
GAS ENGINE OR SIMILAR MOTOR.
(Application filed Aug. 30, 1899.)
(No Model.) 3 Sheets—Sheet 1.
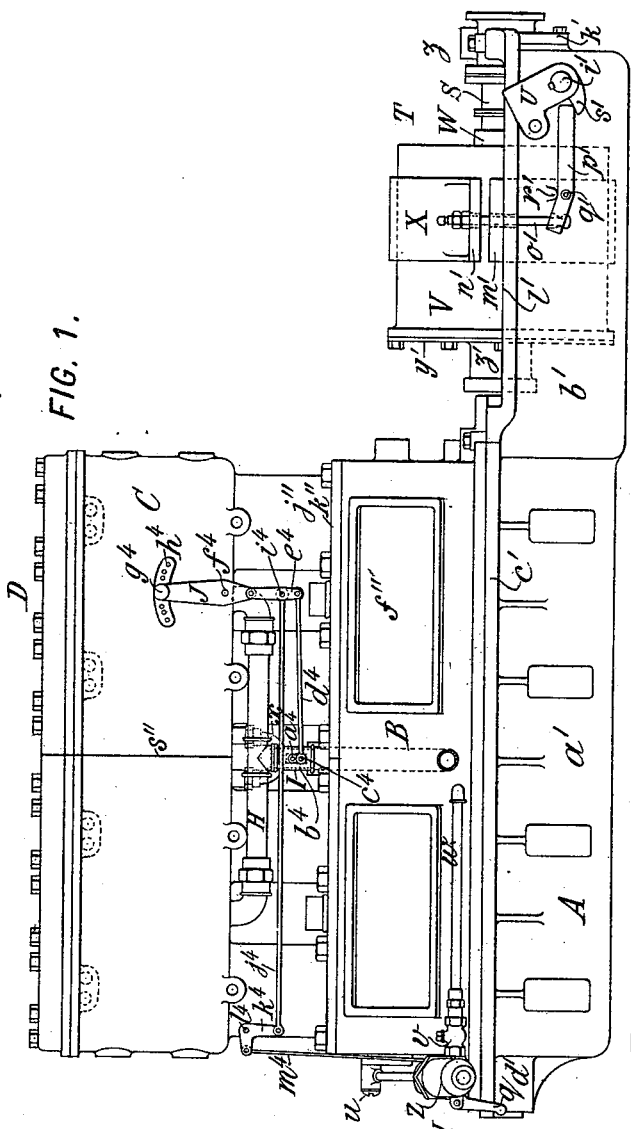
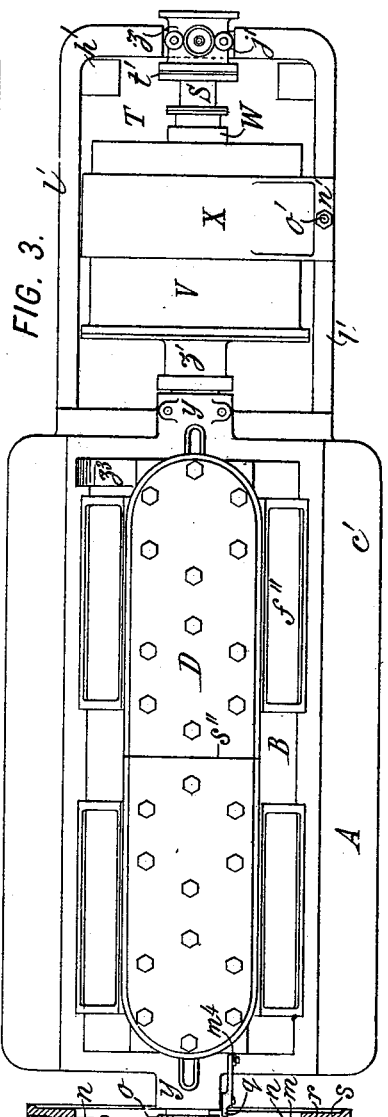
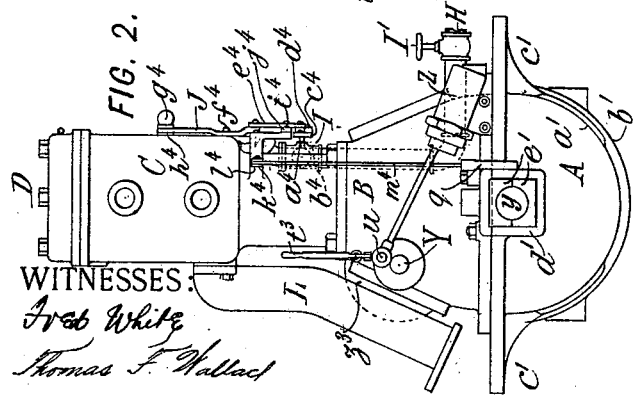
WITNESSES:
Fred White
Thomas F. Wallace
INVENTORS:
Carl C. Riotte and Eugene A. Riotte,
By their Attorneys,
Arthur V. Briesen & Co.

No. 671,934. Patented Apr. 9, 1901.
C. C. & E. A. RIOTTE.
GAS ENGINE OR SIMILAR MOTOR.
(Application filed Aug. 30, 1899.)
(No Model.) 3 Sheets—Sheet 2.
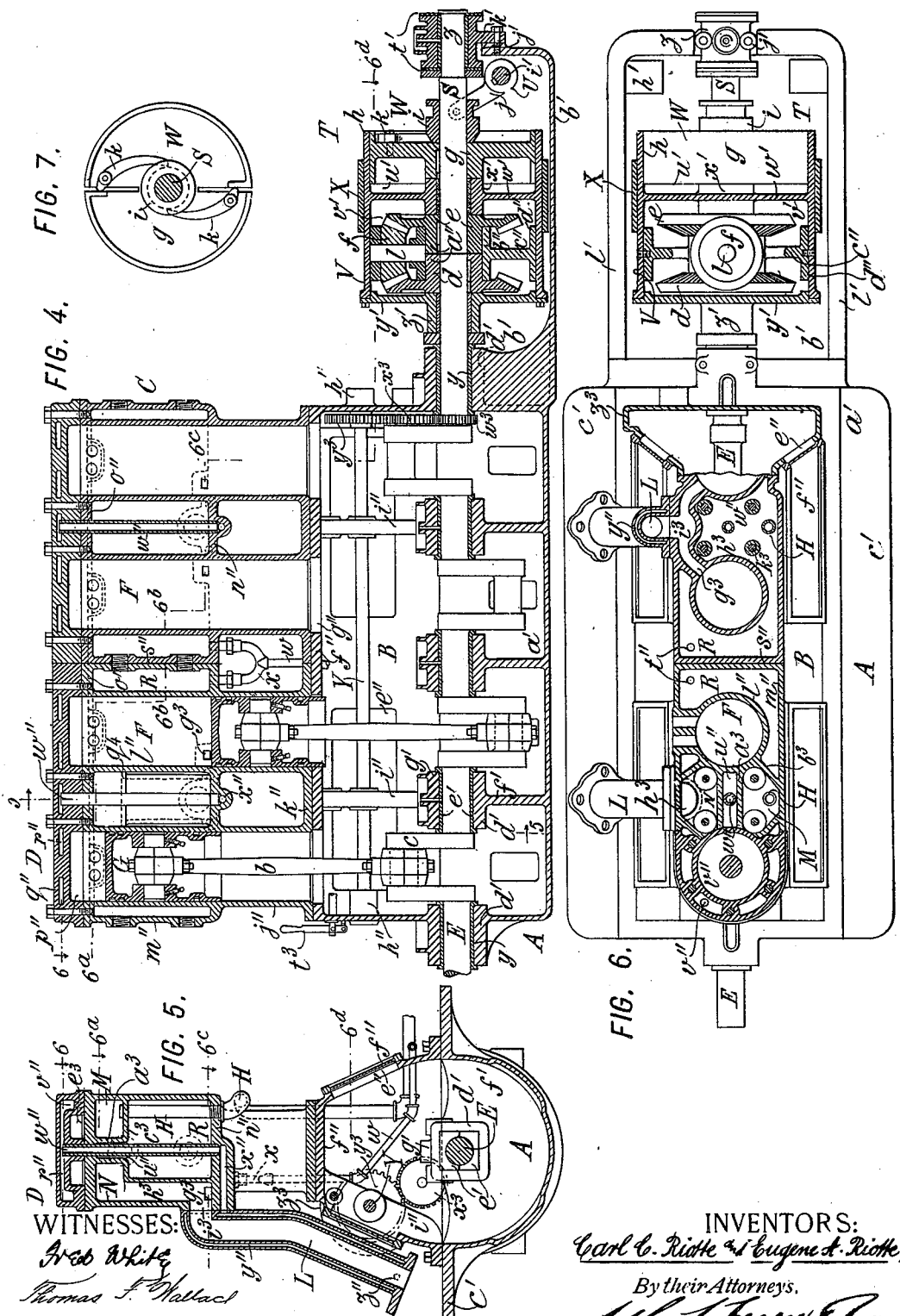
WITNESSES:
Fred White
Thomas F. Wallace
INVENTORS:
Carl C. Riotte and Eugene A. Riotte,
By their Attorneys,
Arthur F. Fraser & Co No. 671,934. Patented Apr. 9, 1901.
C. C. & E. A. RIOTTE.
GAS ENGINE OR SIMILAR MOTOR.
(Application filed Aug. 30, 1899.)
(No Model.) 3 Sheets—Sheet 3.
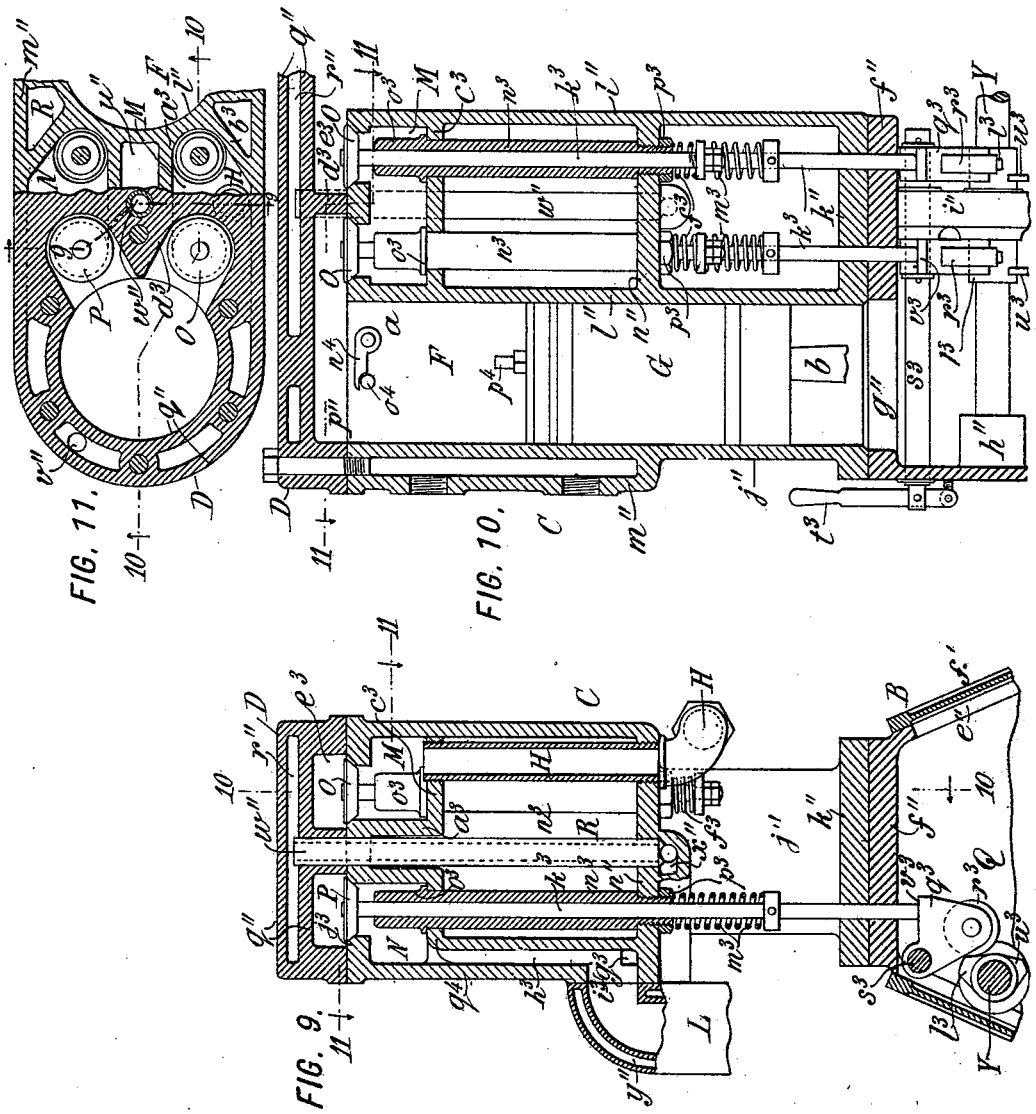
WITNESSES:
INVENTORS:
Carl C. Riotte and Eugene A. Riotte,
By their Attorneys,

UNITED STATES PATENT OFFICE.

CARL C. RIOTTE AND EUGENE A. RIOTTE, OF NEW YORK, N. Y., ASSIGNORS, BY MESNE ASSIGNMENTS, TO THE U. S. LONG DISTANCE AUTOMOBILE COMPANY, OF ELIZABETH, NEW JERSEY.

GAS-ENGINE OR SIMILAR MOTOR.

SPECIFICATION forming part of Letters Patent No. 671,934, dated April 9, 1901.

Application filed August 30, 1899. Serial No. 728,944. (No model.)

*To all whom it may concern:*

Be it known that we, CARL C. RIOTTE and EUGENE A. RIOTTE, citizens of the United States, residing in the city, county, and State of New York, have invented certain new and useful Improvements in Gas-Engines or Similar Motors, of which the following is a specification.

This invention relates to engines, and is especially applicable to gas or hydrocarbon engines operating by the explosion of either a fixed gas or a vaporized hydrocarbon within the cylinder at predetermined succeeding strokes of the piston. Engines of this class generally comprise one or more cylinders, with their pistons, an igniter for igniting the combustible charge in each cylinder, means for regulating the feed of combustible vapor, means for controlling the escape of the spent gases and products of combustion, a feed-pipe for supplying combustible vapors from a suitable source of supply—as, for instance, a vaporizer when hydrocarbon liquids are used or a gas generator or mixer when ordinary gas is employed—a feed-valve for controlling feed to the engine, a governor for regulating this feed to control the speed of the engine, an exhaust-pipe for the spent gases, water-jackets for the cylinders, and a reversing mechanism for transforming the continuous forward motion of the crank-shaft into reverse motion of the driven shaft when reversing is desired or for stopping the driven shaft without stopping the engine. Our present invention aims to provide certain features of improvement in the construction, arrangement, and operation of engines of this general character and to provide an improved engine especially advantageous as a marine engine.

To this end in carrying out a preferred form of our present invention we provide certain features of improvement, which will be hereinafter fully set forth as applied to an explosion-engine of the marine type, although it will be understood that our improvements are not limited to use with an engine of this type.

In the accompanying drawings, which show the preferred form of our invention, Figure 1 is a side elevation of a marine engine embodying our improvements. Fig. 2 is a front elevation thereof. Fig. 3 is a plan view thereof, partly in section. Fig. 4 is a fragmentary vertical axial section thereof. Fig. 5 is a fragmentary vertical cross-section thereof cut approximately on the line 5 5 of Fig. 4 and looking in the direction of the arrow. Fig. 6 is a fragmentary horizontal section thereof cut approximately on the lines 6, $6^a$, $6^b$, and $6^c$ in Figs. 4 and 5. Fig. 7 is a fragmentary end view of the clutch W. Fig. 8 is a fragmentary inner face view of the governor. Fig. 9 is an enlarged fragmentary cross-section on line 9 9 of Fig. 11. Fig. 10 is an enlarged fragmentary vertical longitudinal section on the line 10 10 of Fig. 11, and Fig. 11 is an enlarged fragmentary horizontal section on line 11 11 of Fig. 10.

Referring to the drawings, let A indicate the base, B the pedestal, C the body, and D the cap, of the engine-frame.

E represents the crank-shaft.

F represents the cylinders; G, the pistons; H, the feed-pipe; I, the feed-valve; J, the controlling-lever; K, the governor; L, the discharge-pipes; M, the feed-chambers; N, the exhaust-chambers; O, the feed-chamber valves; P, the exhaust-valves; Q, the exhaust-operating mechanism; R, the water-jackets; S, the driven shaft; T, the reversing mechanism; U, the reversing-lever; V, the reversing-drum; W, the driving-clutch; X, the reversing-clutch; Y, the cam-shaft; Z, the water-pump, and I' a throttle-valve.

As thus far described the parts may be of any usual or suitable construction and of any ordinary or desired operation.

Each cylinder usually carries an igniter $a$ for igniting its explosive charge. Each piston is connected by a pitman $b$ to the corresponding crank $c$ of the shaft E. In operation an explosion is effected in each cylinder at every alternative stroke, the spent gases being expelled from the cylinder on the return stroke of the piston and a fresh charge being drawn into the cylinder during the next down-stroke of the piston and compressed therein during the succeeding upstroke, at the completion of which the charge is ignited and the resulting explosion utilized as the next power-stroke of such piston, one piston being emptied of spent gases and filled with explosive gases as an adjacent piston is discharging or compressing.

The crank-shaft is continuously driven and and has keyed to its rear end the constant beveled gear d, while the reversing-shaft may be driven in either direction and has keyed to it the reversing beveled gear e, the drum V being revolubly connected to either or both shafts and having fixed to it the idler-pinions f, meshing with the gears d and e for either locking these gears to rotate together when the drum is locked to the driven shaft S or for reversing the motion of the gear d and driving the gear e and shaft S backward when the drum V is held stationary by the reversing clutch or brake X, according to usual and well-known principles of operation.

The driving-clutch W consists, as usual, of an expanding clutch-wheel g, the periphery of which is expanded against the inner wall h of the drum by the tapering collar i, which is forced inwardly by the arm j of the lever U for forward driving, the levers k between the flange of the wheel g and the collar i transmitting the motion of the latter to the flange of the wheel in a well-known manner, or this motion may be transmitted in any suitable manner.

The brake X consists of a split band fitting the exterior of the drum-bearing at one end on the base A and drawn together at its ends in any suitable manner to clamp the drum and prevent its rotation. When the drum is held stationary, the pinions f revolve around their axes l to drive the gear e in the reverse direction to the gear d.

The governor K is a speed-governor having a centrifugal weight m, working in a dash-pot n and operating an axially-movable ring o through the medium of a lever p, the ring being forced outwardly as the speed increases and shifting the controlling-lever q for transmitting the motion of the governor to the cut-off valve I. The dash-pot is adjustably set in a recess r in the rim of the wheel and contains a spring s for resisting outward movement of the weight and an adjustable cap t for limiting inward movement of the weight. The dash-pot thus limits movement of the weight in both directions, as well as guiding it and inclosing it. This construction of governor is not specifically claimed in this application, as it is the subject-matter of a separate application filed by us on the 30th day of August, 1899, Serial No. 728,945. Any other form of governor may be substituted for it in the engine to which our present application pertains; but we prefer to use the improved construction, and hence have thus illustrated and described it, as it is particularly suited to the character of engine shown.

The pump Z is an ordinary oscillating cylinder-plunger pump driven by a disk crank u on the cam-shaft Y and discharging past a check-valve v through the water-pipe w into the water-jackets R through the medium of a Y x. The driving-shaft has fore-and-aft bearings y, and the driven shaft has a thrust-bearing z.

As thus far described the parts may be of any suitable construction without materially affecting our present invention.

We will now proceed to describe in detail the various features of improvement incident to our present invention Our invention provides certain improvements in the construction of the base A, which we preferably form of two integral parts—the main bed a' and the longitudinal extension b'— each preferably half-round or semicylindrical on the under side, both externally and internally, both having circular cross-sections corresponding to the arcs of circles of which the longitudinal axis of the crank-shaft is the center, and the one differing in diameter relatively to the other, in the construction shown the extension being the part of greater diameter. The main portion or bed a' has wide projecting flanges c' for resting on the foundation for the engine, the top faces of these flanges being above the axis of the shaft, while the top face of the extension is on a line with its axis. The flange overhangs the sides and ends of the bed, and at each end the latter is formed with an integral rectangular box d', that at the forward end being extended out from the fore wall of the bed to the width of the flange and that at the rear end being extended out from the rear wall thereof. These boxes are adapted to receive and fit the bearing-blocks e' for the crank-shaft, the top faces of these blocks being flush with the top surface of the flanges c', so that both blocks of a bearing are held in an undivided box and preserved in alinement irrespective of the joint between the base and pedestal. This makes a very cheap, convenient, and strong connection, enables the planing of the boxes in the bed alone, so that the bottom of the pedestal may be planed flat, and can be used to close the top of the boxes without the necessity of having any part of the boxes cut in the bottom of the pedestal or for any fine fitting at this point. This relieves the pedestal of all sidewise thrust from the bearing-box and assures a permanent alinement of the boxes and complete rigidity between them.

The hollow interior of the bed constitutes a closed chamber for the cranks, inclosing the latter against ingress of grit and egress of oil. A transverse partition f' is cast across the bed between each pair of cranks, and each partition is likewise formed with a box d', divided on a line with the flange c' and closed by a flat-bottomed cap g', each of these boxes holding a pair of bearing-blocks in the same manner and with the same advantages as described with reference to the outer boxes. The extension b' is divided on a horizontal line intersecting the axis of the shaft and forms an integral connection between the bed a' and the thrust-bearing z of the driven shaft, so that all thrust on this shaft is transmitted directly to the bed, and there can be no variation in the relations existing between the thrust-bearing and the crank-shaft bearings. The hollow extension constitutes a pocket or housing for the reversing mechanism and incloses the lower side of the drum V. It is formed with bearings $h'$ for the shaft $i'$ of the lever U and with a socket $j'$ for the thrust-bearing $z$, and this bearing is formed in a separate box $k'$, bolted onto the outer face of the extension $b'$ and fitting through the socket $j'$ therein, so that at any time it is desired to remove the driven shaft the thrust-bearing and its box can be separated bodily from the base and removed without disturbing the latter or the crank-shaft or other parts of the engine. To facilitate this, the adjacent ends of the crank-shaft and driven shaft are terminated within the socket in the extension $b'$ and abut against each other therein, so that at any time by opening the separable connection between the thrust-bearing box and the base the thrust-shaft can be removed.

The top edge $l'$ of the extension $b'$ in the construction shown supports one end, $m'$, of the reversing-clutch X, and the other end, $n'$, of this clutch stands normally above and out of contact with the supported end $m'$, the two being held in place by an adjustable tension-rod $o'$, traversing apertures through the ends of the clutch and the flange $l'$ of the extension and engaged at its lower end by a lever $p'$, operated by the reversing-lever U, and fulcrumed intermediate of its ends on an axis $q'$ to the outer wall of the extension, being mounted immediately below a fulcrum-lug $r'$, which takes the strains in use off from the fulcrum $q'$. The lever U has a short arm $s'$ beneath the lever $p'$ and engaging the latter to apply the reversing-clutch when the lever U is tilted aft.

The shaft S is independent of the crank-shaft in all respects except the connection between the two for revolving the driven shaft from the crank-shaft, and the driven shaft is provided with opposite thrust-collars $t'$ at the fore and aft sides of the thrust-box $k'$, so that all the propelling and reversing strains on the shaft S are taken up by these collars and transmitted both directly to the thrust-box and through the latter to the base independently of the crank-shaft and its bearings, so that the strains in use are prevented from in any manner affecting the operation of the engine proper or from wearing or disturbing the adjustment of the engine or reversing mechanism, the separated top flanges $l'$ of the extension constituting a stiff frame for the transmitting of the thrust strains from the thrust-bearing to the bed and the solid bottom wall adding rigidity to this frame and assisting in transmitting such strains.

In the construction shown means are provided for permitting ready separation of the reversing-gear from the crank-shaft, also for protecting this gear from dust and foreign matter and for enabling it to be run in oil. In the construction and arrangement of this gear and its mounting the drum V is constructed with a hollow clutch-chamber $u'$, opening at its rear end, with a hollow gear-chamber $v'$, open at its forward end, and with an intermediate solid wall $w'$, extending from its hub $x'$ to its outer wall and isolating the gear-chamber from the clutch-chamber, and the drum is provided with a closed cover $y'$, bolted with a leak-tight joint to its forward end and having a hub $z'$, the hubs $x'$ and $z'$ making revoluble bearings with the adjacent ends of the shafts S and E, respectively, so that the drum and its cover may have the additional functions of assisting in holding the adjacent ends of these shafts in alinement and relieving them of the separation thrusts of the gears $d$ and $e$. The gears $d$ and $e$ are fixed to the ends of their respective shafts within the chamber $v'$ and have projecting hubs $a''$, which are turned off on their outer faces and are passed within the hub $b''$ of a skeleton wheel $c''$, which carries the pinions $f$ between this hub and its rim $d''$, being fixed within the gear-chamber of the shell and revolving with the latter. In this way the hub of the wheel $c''$ assists in assuring alinement of the gears $d\ e$ and carries the strain of the pinions $f$, as well as relieving the drum from any wear from these pinions and avoiding the necessity of perforating the drum for the pinion-spindles. In this way it will be seen that the reversing-gear is completely inclosed in a hermetically-sealed chamber, which is proof against ingress of dust or egress of oil and which may be charged with oil, so that the reversing-gear will always be running in oil, since there is no opportunity for escape of the oil in use. It will also be seen that access can readily be had to the reversing-gear or that it can be removed or replaced conveniently by simply unscrewing the cover $y'$, whereupon the gear can be slid back on the shaft from the cover to give access to the interior, or by also unscrewing the thrust-box $k'$, whereupon the gear-shaft and box can be lifted out of the extension of the base and removed to any suitable place for repairs or inspection.

In marine engines the location of the gear-chamber at the forward end of the drum and the arrangement of an imperforate wall $w'$ at the after end of this chamber is especially important, especially when a tight cover is not employed, as the axis of the engine is generally inclined toward the stern, and were the reverse arrangement employed the oil in the gear-chamber would run out and escape. For the same reason the location of the driving-clutch chamber $u'$ at the after end of the drum and forming it with an open rear end is advantageous, since thereby any water of condensation, foreign matter, or oil which may have accumulated in this chamber through any cause and which might interfere with the operation of the clutch is free to run outwardly and escape into the extension, so that there is always an assurance that the clutch-chamber is free and in condition for operation, as well as that the gear-chamber is clean and charged with oil.

In the operating mechanism shown the one lever U operates both the driving-clutch and the reversing-clutch, so that the user can be assured of the simultaneous reverse action of these parts, the lever for this purpose being formed with a short arm $s'$ outside of the extension $b'$ and acting against the lever $p'$ for pressing the reversing-clutch when the lever is tilted aft, and being also provided with the short arm $j$ within the extension $b$, keyed to the shaft $i'$ and engaging the groove of the ring $i$ for pressing that ring inwardly and applying the driving-clutch W when the lever U is tilted forward. Thus the forward tilting of the lever applies the driving-clutch and simultaneously frees the reversing clutch or brake, and rearward movement of the lever applies the reversing-clutch and releases the driving-clutch.

In the construction shown the pedestal B is a hollow rectangular frame having flat top and bottom walls and downwardly-diverging side walls. It is bolted to the bed $a'$ and holds the blocks $e'$ in the end boxes. The pedestal has one or more manholes $e''$ in its side walls, which are closed by suitable covers $f''$, so that by removing these easy access may be had to its interior, which constitutes an upward extension of the hollow interior of the bed. The top wall $f'''$ has a plurality of openings $g''$, corresponding in position to the cylinders F and constituting extensions thereof for receiving the lower ends of the pistons during the downstrokes of the latter. The pedestal is formed with bearings $h''$ for the cam-shaft Y at its ends and with internal brackets $i''$, crossing its manholes $e''$ and carrying additional bearings $h''$ for the cam-shaft.

The body C comprises one or more castings, each containing, preferably, two cylinders, the cylinders being extended downwardly in separate cylindrical portions $j'''$, cast integrally with the body and connected at bottom by a flat bottom wall $k''$, bolted to the top wall of the pedestal. Around the upper ends of the cylinders the body has, in addition to the cylinder-walls $l''$, an outer wall $m'''$, inclosing the water-jackets R, a bottom wall $n''$ thereof for these jackets, and a top wall $o''$ thereof near the upper end of the cylinder. The upper ends of the cylinders are closed by the caps D, which have downwardly-opening cylindrical sockets $p''$, constituting upper ends of the cylinders, double walls $q''$, and intermediate water-jacket spaces $r''$. When more than two cylinders are used in an engine, we prefer to form the bodies with round ends at their remote extremities and with flat ends $s''$ at their adjacent extremities and to form the caps of like contour, the bolts connecting the bodies with the pedestal sufficing to hold each body in position relatively to the other.

The water-jackets R in each body pass entirely around each cylinder thereof to a depth equaling the length of the piston-stroke, so that each cylinder is entirely surrounded by water. Water is supplied from the branch $x$ into the holes $t''$ and flows around and up between the cylinders, rising between the feed and exhaust chambers M and N by the passage-way $n''$, and at convenient points the water rises through the passage-ways $v''$ into the water-jacket $r''$ of the cap, through which it flows across the top of the cylinders to the outlet-pipe $w''$, which carries it down through the bottom wall of the cap and the top wall of the body and through the water-jacket R of the body into an escape-passage $x''$, cored in the bottom wall $n''$, which opens at the side of the body into a water-jacket $y''$, which surrounds the discharge-pipe L, so that this pipe is water-jacketed to its lower end, from which the water may escape through an outlet $z''$. Thus there is a continuous water-jacket surrounding the sides and top end of the cylinders, through which there is a current, and the discharge-pipe adjacent to the body is completely water-jacketed, so that the engine may be kept at a comparatively low temperature.

In the construction shown the feed-chamber for the cylinders consists of the chamber M, formed between two adjacent cylinders by a vertical wall $a^3$, side walls $b^3$, and a bottom wall $c^3$, through which the ports for the valves O are formed. The feed-pipe B discharges vapors into the chamber M, and these vapors escape from the chamber past the valves O, at one side or the other of the partition $d^3$, into the cylinder-chambers $e^3$ by suction on the downstroke of the piston in the corresponding cylinder after the spent gases have been discharged by a preceding upstroke, the valves O operating to release the gases when the suction is sufficient to overcome the gravity of the valves and the resistance of the seating-springs $f^3$ thereof.

As shown, an auxiliary exhaust is provided for the spent gases at a point at or near the extremity of the downstroke of the piston. This may consist, as shown, of an exhaust-port $g^3$, opening from each cylinder at a point above the piston when the latter is at its extreme downstroke and leading directly to the discharge-pipe. This exhaust-port is shown as a core leading from each cylinder to the exhaust-passage $h^3$, cored in the body C between two cylinders and opening at the side of the body in an outlet $i^3$, communicating with the interior of the pipe L. This auxiliary exhaust is independent of the exhaust-valves and is controlled by the position of the piston in the cylinder it is designed to relieve and affords a large free outlet for the spent gases as soon as the downstroke of the piston approaches completion, so that before this port is closed by the return stroke practically all pressure may have escaped from the cylinder, and there is very little resistance to be offered by the remaining spent gases during the upstroke of the piston, and the amount of remaining gases is so reduced that this upstroke can readily discharge them through the discharge-valves. The discharge-valves P seat on the top wall $j^3$ of the discharge-chambers N and are operated from the cam-shaft through rods $k^3$, which are lifted by the cams $l^3$ at the proper time for relieving the spent gases from a cylinder and are seated by springs $m^3$ after this discharge. The rods $k^3$ rise through the water-jacket R, being housed therein each by a tube $n^3$, passed down through the wall $q^4$ of the discharge-chamber, having a head $o^3$, bearing on the top face of this wall, passing out through the wall $n''$ at their lower ends at the bottom of the water-jacket R and drawn downwardly by the nuts $p^3$ at the under side of this wall, so as to make a tight joint to prevent the escape of water from the jacket, avoid the necessity of coring out passage-ways for the rods, and attain the maximum of water-jacket space.

The cam-shaft Y has one cam $l^3$ for each exhaust-valve, the rod $k^3$ of each valve being operated from its cam through the medium of a lifter $q^3$, on which the rod loosely rests and which carries an antifriction-roller $r^3$, engaged by the cam. Each lifter is pivoted on a shaft $s^3$, which is axially adjustable by means of a relief-lever $t^3$ to throw the lifters axially along the cams from their normal position in the path of the regular cam $l^3$ to their starting position in which they are in this path and also in the path of the extra relief-cam $u^3$, which is a common construction, relieving back pressure near the upstroke of the engine to facilitate turning the crank-shaft for starting the engine. To permit this axial movement of the lifters, they are unconnected to the valve-rods, being provided with flat-topped faces $v^3$, which support the lower ends of the rods and which can slide along these ends with the axial adjustment of the lifters. The cam-shaft is driven by a pinion $w^3$ on the crank-shaft, which pinion meshes with an idler $x^3$, which meshes with a gear $y^3$ in the cam-shaft, the casing being formed with a hollow swell $z^3$ to accommodate this gear.

The pedestal B incloses the cam-shaft, cams, lifters, and the driving-gear of the cam-shaft and also the water-pipe $w$ and a part of the feed-pipe H, these pipes going down through the top wall of the pedestal and coming out through the side wall over one of the bearings.

We have shown a regulating-lever J and a connection between the governor and this lever for controlling the feed-valve I. This valve is preferably a butterfly-valve consisting of a disk pivoted at its center on an axial rod $a^4$, extending at right angles to the axis of its chamber $b^4$ and having a crank $c^4$, which is connected to a rod $d^4$, which at its outer end is connected to the short end of a lever $e^4$, to the long end of which is connected the short end of the lever J below its fulcrum $f^4$, the long end of this lever having a handle $g^4$ engaging a rack $h^4$ for holding the lever in position. The lever J is fulcrumed to a fixed point, and its position can be adjusted by springing its handled end out from engagement with the rack and setting it from, say, the left-hand end of the rack, which is full speed, toward the right-hand end of the rack, which is either the minimum of feed or no feed, as desired. In its movements it moves the lever $e^4$, which latter is fulcrumed at $i^4$ to a movable fulcrum intermediate of its ends. This fulcrum is adjusted by the governor K in any suitable manner, the parts being so set that when the lever J is at full-feed position the lever $e^4$ will stand in such position that the valve I will be fully open, and as the lever J is adjusted from the full-feed position the lever $e^4$ will be tilted to throw the valve I toward the closed position, and in any position of the levers J and $e^4$ the fulcrum of the latter lever will be shifted by the governor to vary the position of the valve I to make the necessary variations in the feed requisite to controlling the speed of the engine. The connection between the lever $e^4$ and the governor may be any suitable or desired connection, or the governor may be so connected to either lever as to combine the requisite governing variations with the ability for manual adjustment, so that one valve suffices for both manual and automatic control of the feed; but we prefer the simple construction shown, which consists in fulcruming the lever $e^4$ to one end of a rod $j^4$, the other end of which is connected to a bell-crank $k^4$, fulcrumed on a fixed point $l^4$ to the engine and engaged by a rod $m^4$ at its other arm, which rod descends and is connected at its lower end to one arm of the shifting lever $q$, operated by the shifting collar $o$ of the governor, as best seen in Figs. 1, 2, and 3. In this way the user can at any time manually adjust the feed to the engine to adapt it to the work or speed desired, and the governor will automatically control the speed of the engine. The lever J can be set at a predetermined adjustment and left there and stopping of the engine be effected by shutting off the feed throttle-valve I'.

The igniter $a$ shown consists of a pivoted contact-lever $n^4$, constituting one terminal of a closed circuit and lying on a contact $o^4$, constituting the other terminal, the circuit being broken by a breaker-pin $p^4$, projecting from the top of the piston, so that on the upstroke this pin will lift the lever and cause a spark for igniting the explosive charge.

In use of the engine shown the engine can be easily and securely mounted by means of the projecting flanges of the base. The convex contour of the bed will occupy little room, all thrusts will be taken up in the frame and its extension, correct alinement will be preserved, and the engine will be simple, compact, and self-contained. One hand will serve to reverse the driving direction, a single motion of the one lever U in either direction being sufficient for reversal. The engine can be nicely regulated by the valve J, accurately governed by the governor, and easily started by the lever $t^3$. The temperature of the cylinders and exhaust-pipe will be kept low by the complete water-jacketing and the arrangements for circulating the water. The exhaust of the spent gases will be rapid and effectual, so that the minimum of resistance on the return stroke will be found and the capacity for drawing in a new charge of explosive vapor will be increased.

It will be seen that our invention provides various improvements in gas and other engines which can be variously and advantageously availed of, and it will be understood that the invention is not limited to the particular details of construction, use, or combination of parts set forth as constituting the preferred embodiment of our invention, since our improvements can be employed in whole or in part, according to such combinations, uses, or details of construction and arrangement as circumstances or the judgment of those skilled in the art may dictate, without departing from the spirit of the invention.

We do not herein claim the reversing mechanism described and shown, as this mechanism forms the subject-matter of an application filed by us November 29, 1899, Serial No. 738,673, as a division hereof.

What we claim is, in engines, the following-defined novel features and combinations, substantially as hereinbefore set forth, namely:

1. In an engine, the improved base consisting of a metal body having transverse walls, an intermediate connecting portion, boxes for carrying bearing-blocks in said walls, and an arc-shaped body connecting said walls and having in cross-section the shape of an arc struck from the center of said boxes, the top of said walls being above said center, whereby when two bearing-blocks are inserted in said boxes the latter will support the block both above and below such center.

2. In an engine, a base having transverse walls and intermediate side walls, and having bearing-boxes integral with said transverse walls and having their centers below the top of the latter, diametrically-divided bearing-blocks in said boxes, and a shaft having bearings in said blocks, whereby the blocks are supported by the boxes above and below the center of the shaft.

3. In an engine, the combination with a pedestal, of a body supporting the pedestal having transverse walls and bearing-boxes in said walls extending above the center of the bearing, and terminating flush with the bottom wall of the pedestal, and blocks in said boxes, the top of said blocks being flush with the bottom of said pedestal whereby said pedestal constitutes a cap for said boxes and the side walls of the boxes support the bearing-blocks at both sides of the center of the bearings.

4. In engines, a base having bearings for a driving-shaft, in combination with an integral extension connected to said base and having a thrust-bearing for a driven shaft, a driving-shaft carried by the bearings of said base, a separate driven shaft carried by the thrust-bearing of said extension, and means connecting said shafts together, whereby the thrusts of the driven shaft are taken up by said thrust-bearing and transmitted to said base without being thrown on the bearings of the driving-shaft.

5. In an engine, the combination with driving and driven shafts, and means for connecting them together, of a base having bearings for the driving-shaft, and having an integral extension having a thrust-bearing for the driven shaft, whereby the thrusts of the latter are taken up by the thrust-bearing and their transmission to the bearings of the driving-shaft is avoided.

6. In an engine, the combination with driving and driven shafts, of a base having bearings for the driving-shaft and having an integral extension, and a removable bearing separably carried by said extension, and carrying the driven shaft, whereby by removing said bearing the driven shaft can be removed without disturbing the driving-shaft.

7. In an engine, the combination with driving and driven shafts and a reversing mechanism connecting their ends, of a base having bearings for the driving-shaft, an extension carried by said base having a bearing for the driven shaft, said extension having a frame extending around said mechanism and connecting said base and said bearing together, and formed integrally with said base.

8. In an engine, the combination with driving and driven shafts, and reversing mechanism connecting them together, of a base having bearings for the driving-shaft, an extension carried by said base and having a bearing for the driven shaft outwardly of said mechanism, and having a cavity in its upper side inclosing said mechanism, and a convex bottom wall beneath said mechanism and between the bearing of said driven shaft and said base.

9. In an engine, the combination with a base having an arc-shaped bottom wall, of an extension formed integrally with said base and having an arc-shaped bottom wall, said base having bearings for a crank-shaft, and said extension having a bearing for a thrust-shaft, said base having a crank-chamber, and said extension having a chamber on its upper side, and said base and extension having concentric bottom walls of relatively different radii.

10. In an engine, the combination with a base having an arc-shaped bottom wall, of an extension formed integrally with said base and having an arc-shaped bottom wall, said base having bearings for a crank-shaft, and said extension having a bearing for a thrust-shaft, said base having a crank-chamber, and said extension having a chamber on its upper side, and said base and extension having concentric bottom walls in the arc of a circle struck from the center of said bearings.

11. In an engine, the combination with a base having an arc-shaped bottom wall, of an extension formed integrally with said base and having an arc-shaped bottom wall, said base having bearings for a crank-shaft, and said extension having a bearing for a thrust-shaft, said base having a crank-chamber and said extension having a chamber on its upper side, and said base and extension having concentric bottom walls and flat outwardly-projecting flanges at top.

12. In an engine, a base having a crank-chamber and an integral extension having a chamber in its top side, said base and extension having convex bottom walls, and said base having bearings for a crank-shaft and having a flat top wall above the axis of such bearings, and said extension having a bearing for a thrust-shaft, and a flat top wall in the plane of the axis of such bearings.

13. In an engine, the base A having the body $a'$, boxes $d'$, flange $c'$, and hollow extension $b'$ having the flange $l'$ and bearing-socket $j'$.

In witness whereof we have hereunto signed our names in the presence of two subscribing witnesses.

CARL C. RIOTTE.
EUGENE A. RIOTTE.

Witnesses:
GEO. H. FRASER,
THOMAS F. WALLACE.